US009075884B2

(12) United States Patent
Forstall et al.

(10) Patent No.: US 9,075,884 B2
(45) Date of Patent: Jul. 7, 2015

(54) COLLECTING WEB PAGES/LINKS FROM COMMUNICATIONS AND DOCUMENTS FOR LATER READING

(75) Inventors: Scott Forstall, Cupertino, CA (US); Patrick L. Coffman, Cupertino, CA (US); Raymond S. Sepulveda, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 358 days.

(21) Appl. No.: 13/550,537

(22) Filed: Jul. 16, 2012

(65) Prior Publication Data

US 2013/0332807 A1 Dec. 12, 2013

Related U.S. Application Data

(63) Continuation-in-part of application No. 13/492,749, filed on Jun. 8, 2012.

(51) Int. Cl.
*G06F 17/00* (2006.01)
*G06F 17/30* (2006.01)

(52) U.S. Cl.
CPC .... *G06F 17/30884* (2013.01); *G06F 17/30867* (2013.01)

(58) Field of Classification Search
CPC ............... G06F 17/30867; G06F 17/30884
USPC ................. 715/205, 206, 207, 208
See application file for complete search history.

(56) References Cited

U.S. PATENT DOCUMENTS

| | | | |
|---|---|---|---|
| 5,500,936 A * | 3/1996 | Allen et al. ............... | 715/808 |
| 6,014,677 A | 1/2000 | Hayashi et al. | |
| 6,334,145 B1 * | 12/2001 | Adams et al. ............... | 709/217 |
| 6,344,851 B1 * | 2/2002 | Roberts et al. ............... | 345/418 |
| 7,010,527 B2 * | 3/2006 | Alpha ............... | 707/749 |
| 7,249,315 B2 | 7/2007 | Moetteli | |
| 7,418,657 B2 * | 8/2008 | Gorelick et al. ............... | 715/234 |
| 7,483,941 B2 * | 1/2009 | Carlson et al. ............... | 709/203 |
| 7,747,466 B2 * | 6/2010 | Fernandez ............... | 705/14.47 |
| 7,885,986 B2 * | 2/2011 | Anderson et al. ............... | 707/805 |
| 7,889,184 B2 * | 2/2011 | Blumenberg et al. ......... | 345/173 |
| 8,041,701 B2 * | 10/2011 | Amato et al. ............... | 707/707 |
| 8,065,391 B2 * | 11/2011 | Olliphant ............... | 709/218 |
| 8,219,934 B2 * | 7/2012 | MacHeffner ............... | 715/854 |
| 8,363,065 B2 * | 1/2013 | Scott et al. ............... | 345/626 |
| 8,433,995 B1 | 4/2013 | Karam | |
| 8,447,751 B2 * | 5/2013 | Stouffer et al. ............... | 707/709 |
| 8,543,668 B1 * | 9/2013 | Long ............... | 709/219 |

(Continued)

OTHER PUBLICATIONS

Instapaper Blog, "Instapaper 3.0 Is Here", Mar. 12, 2011, downloaded from archive: http://blog.instapaper.com/post/3772087268, pp. 1-4.*

(Continued)

*Primary Examiner* — Laurie Ries

(74) *Attorney, Agent, or Firm* — Morgan, Lewis & Bockius LLP

(57) ABSTRACT

Systems, methods, and computer program products for collecting webpages/links from communications and documents for later reading is disclosed. User interface elements allow a user to select multiple webpages or links at once for addition to a reading list or other data structure for later reading. The selection mode may be entered using a variety of inputs. Animated user interface elements indicate the progress of adding the webpages or links to the data structure.

30 Claims, 14 Drawing Sheets

(56) References Cited

U.S. PATENT DOCUMENTS

| | | | |
|---|---|---|---|
| 8,736,860 B2* | 5/2014 | Meike et al. | 358/1.13 |
| 2003/0097361 A1 | 5/2003 | Huang et al. | |
| 2003/0156135 A1* | 8/2003 | Lucarelli | 345/757 |
| 2004/0001106 A1* | 1/2004 | Deutscher et al. | 345/838 |
| 2005/0154995 A1* | 7/2005 | Miller et al. | 715/772 |
| 2005/0273693 A1* | 12/2005 | Peterson | 715/500.1 |
| 2007/0016853 A1* | 1/2007 | Abagyan et al. | 715/515 |
| 2007/0226617 A1* | 9/2007 | Traub et al. | 715/700 |
| 2007/0271498 A1 | 11/2007 | Schachter | |
| 2008/0086471 A1* | 4/2008 | Ritter et al. | 707/8 |
| 2008/0134082 A1* | 6/2008 | Delacroix et al. | 715/790 |
| 2009/0241017 A1 | 9/2009 | Brooks et al. | |
| 2010/0161587 A1 | 6/2010 | Sullivan | |
| 2010/0251165 A1* | 9/2010 | Williams | 715/784 |
| 2011/0161790 A1* | 6/2011 | Junior et al. | 715/205 |
| 2011/0271228 A1* | 11/2011 | Bederson et al. | 715/803 |
| 2012/0185758 A1 | 7/2012 | Huang et al. | |
| 2012/0221951 A1* | 8/2012 | Kidron | 715/716 |
| 2012/0227077 A1* | 9/2012 | Spivack et al. | 725/110 |
| 2012/0240075 A1* | 9/2012 | Kim et al. | 715/776 |
| 2013/0332806 A1 | 12/2013 | Forstall | |
| 2013/0332807 A1 | 12/2013 | Forstall et al. | |

OTHER PUBLICATIONS

Gibbs, Mark, "Instapaper: A Splendid Stuff Saving Service", Network World, Jan. 25, 2011, pp. 1-2.*
Burkell, Marge, "Using Add to Reading List in Safari iPad App," Apps for iPads, [online], Nov. 7, 2011, [retrieved Oct. 30, 2013], retrieved from the Internet: <URL: http://appsforipads.net/apps-for-ipads/ipad-tips-and-tricks/add-read-list-safari-ipad>, 2 pages.
International Search Report and Written Opinion mailed Nov. 12, 2013 in PCT/US2013/041963, 8 pages.
Non-Final Office Action for U.S. Appl. No. 13/492,749, mailed Jul. 31, 2014, 14 pages.
Final Office Action, dated Jan. 5, 2015, received in U.S. Appl. No. 13/492,749, 14 pages.
International Preliminary Report on Patentability, dated Dec. 9, 2014, received in International Application No. PCT/US2013/041963, which corresponds to U.S. Appl. No. 13/492,749, 5 pages.

* cited by examiner

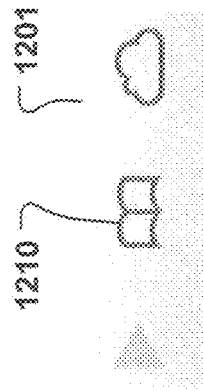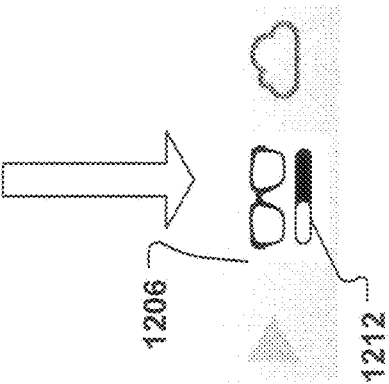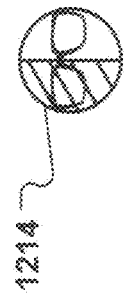
FIG. 12B          FIG. 12C          FIG. 12D
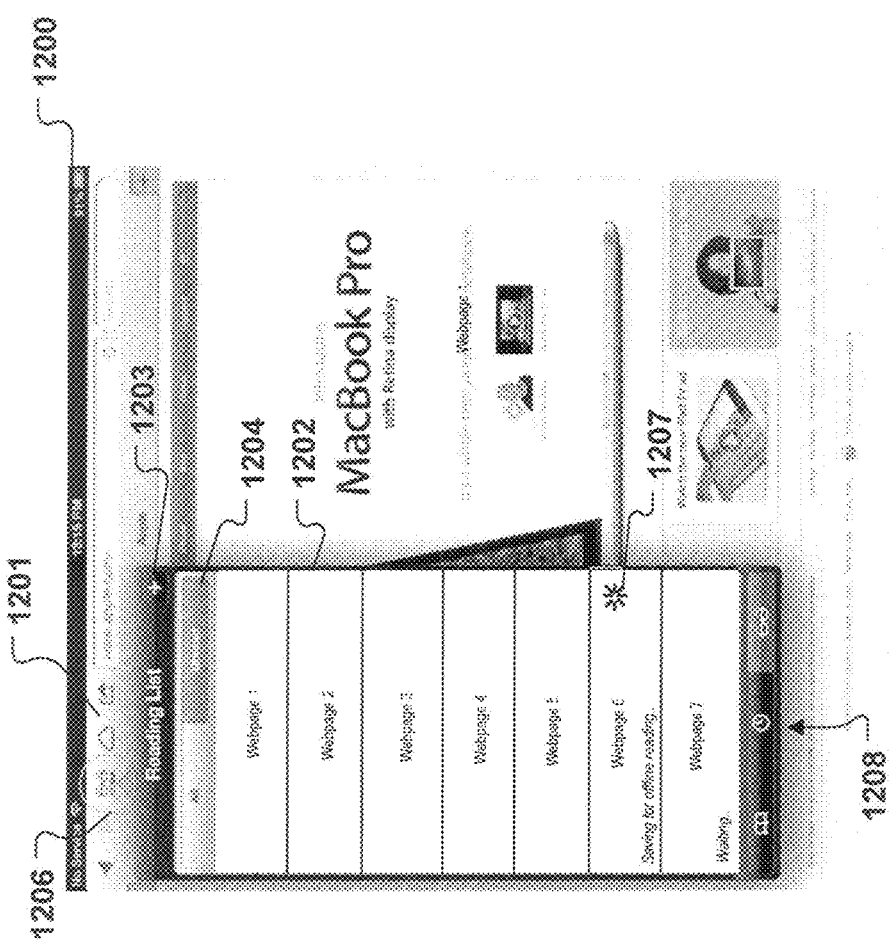
FIG. 12A

COLLECTING WEB PAGES/LINKS FROM COMMUNICATIONS AND DOCUMENTS FOR LATER READING

RELATED APPLICATION

This application is a continuation-in-part of U.S. patent application Ser. No. 13/492,749, for "Collecting Web Pages/Links From Communications and Documents for Later Reading," filed Jun. 8, 2012, the subject matter of which is incorporated by reference herein in its entirety.

TECHNICAL FIELD

This disclosure is related generally to bookmarking webpages/links.

BACKGROUND

A bookmark is a locally stored Uniform Resource Identifier (URI) for a webpage on the World Wide Web (WWW). Bookmarks are typically accessed through a menu in a user's web browser but can also be accessed or managed by an external application. A bookmark folder or bar can be used to organize bookmarks on a device. Shared bookmarks allow users to share similar interests or to pool web resources. Remote servers can store bookmarks so the bookmarks are accessible from anywhere in the world through a network connection using wired or wireless devices.

Apple Inc. of Cupertino, Calif., USA, introduced a "Reading List" feature in its iOS™ 5 operating system. Reading List is a bookmarking feature that allows tagging of websites for reading later. The Reading List can be synced across mobile and desktop browsers through Apple's iCloud® service.

SUMMARY

Systems, methods, and computer program products for collecting webpages/links from communications or documents for later reading are disclosed. One or more user interface elements allow a user to select multiple webpages or links at once for addition to a reading list or other data structure for later reading. The links can be included in a webpage or any other communication (e.g., e-mail, text message, blog, Tweet®, social network post) or document (e.g., .pdf, word processing document). The selection mode may be entered using a variety of inputs, such as a long press on a link or by pressing a user interface element. Visual feedback can be provided to the user that the selection mode has been entered. For example, visual feedback such as a flash or a vertical transition sweeping over the viewable links can be used to inform the user that the selection mode has been entered. An audio effect (e.g., a beep) or force feedback (e.g., a vibration) also can be used as feedback to the user that the selection mode has been entered.

In the selection mode, a check box or other suitable user interface element can be provided next to each webpage or link that allows a user to select individual pages or links to be included in the reading list or other data structure all at once. In some implementations, once the selection mode is entered, another user interface element can be provided that allows the user to select all available webpages or links for inclusion in the reading list or other data structure.

In some implementations, user interface elements indicate the status of adding webpages or links to the data structure. For example, the adding can be initiated by selecting a bookmark icon or other user interface element. The bookmark icon can be animated to transition into a reading list icon during the adding. The reading list icon can include a progress indicator to indicate the progress of the adding.

Particular implementations disclosed herein provide one or more of the following advantages. A user can save time by selecting multiple webpages or links at once for addition to a reading list or other data structure for later reading or viewing.

The details of the disclosed implementations are set forth in the accompanying drawings and the description below. Other features, objects, and advantages will be apparent from the description and drawings, and from the claims.

DESCRIPTION OF DRAWINGS

FIGS. 12A-12D illustrate exemplary user interface elements associated with the adding of a webpage or link to a data structure.

The same reference symbol used in various drawings indicates like elements.

DETAILED DESCRIPTION

Adding Pages/Links to Reading List

Figure 1:
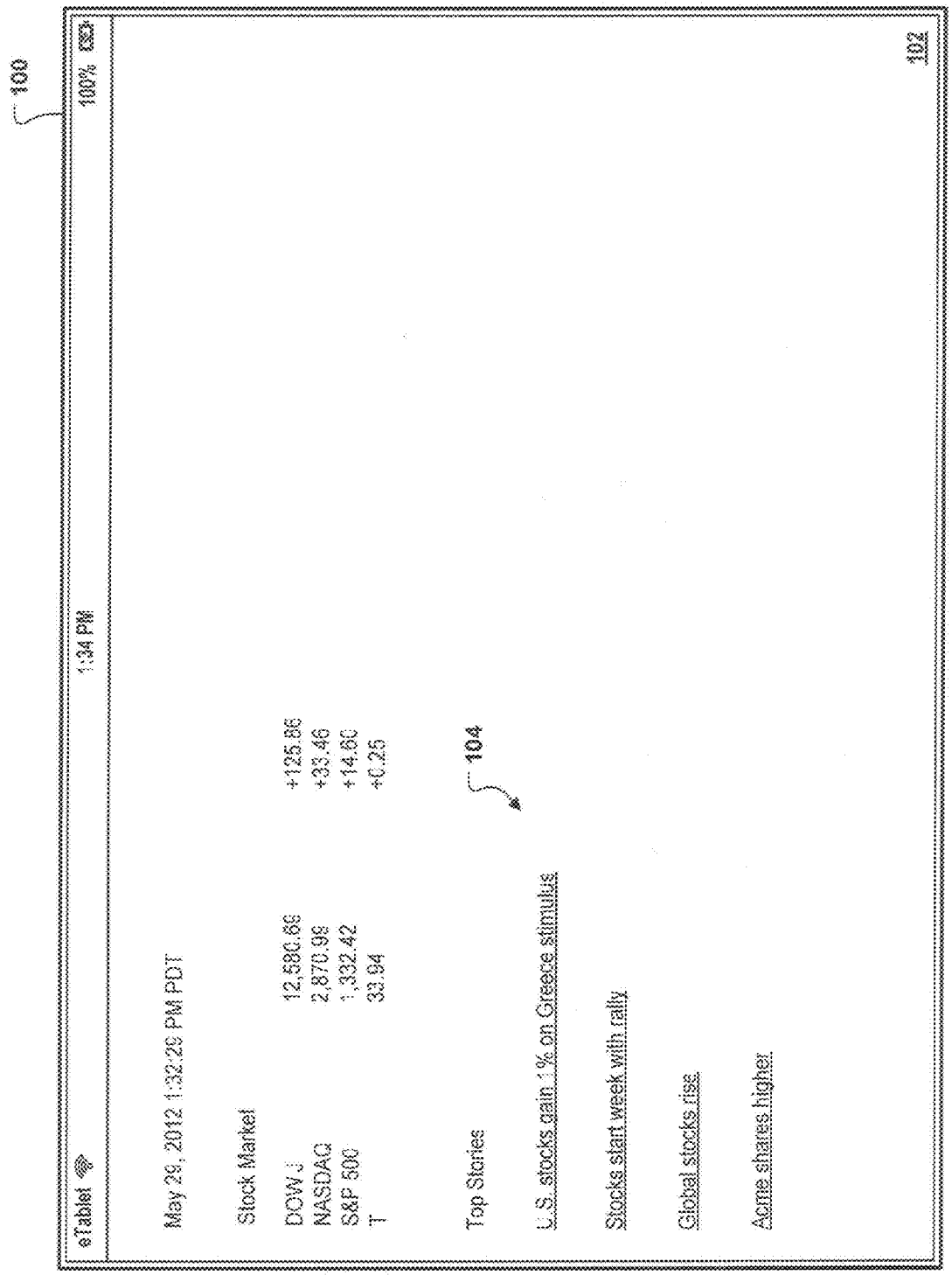
FIGS. 1-5 illustrate exemplary user interface elements for selecting multiple webpages or links for later reading.

FIG. 1 illustrates an exemplary user interface 102 for selecting multiple webpages or links for later reading. In the example shown, user interface 102 is provided by a stocks application. The stocks application was invoked on a mobile device 100 (e.g., electronic tablet), which includes a display for presenting user interface 102. User interface 102 includes stock quotes and a number of links 104 to webpages that contain financial news stories.

Although a mobile device is described in this example, the disclosed implementations can be used by any device capable of displaying webpages or links, including but not limited to smart phones, notebook computers, desktop computers, e-mail devices, network appliances, game consoles, TV set-top boxes, etc. Although a stocks application is described in this example, the disclosed implementations can be used by any application that is executed on a device or is provided as a Web application by a remote service through a network, such as service 1130 described in reference to FIG. 11.

In the example shown, a user desires to move links 104 to a reading list. A reading list is a bookmarking feature that allows tagging of websites for reading later. Although a reading list is described in this example, the disclosed implementations can use any data structure for bookmarking webpages or links for later reading including but not limited to a bookmark bar or menu. To save a plurality of links to the reading list, the user can make a long press (e.g., one or more seconds) on any one of links 104 to place the device in a selection mode. If the display is touch-sensitive or a track pad is providing user input, the user can press the link with their finger or a stylus. If the display is not touch-sensitive, the user can click on the link with a pointing device (e.g., a mouse), or hover a cursor over the link for a predetermined amount of time (e.g., one or more seconds). Alternatively, a dedicated or context-sensitive user interface element can be included in user interface 102, which when selected, presents a window, pane or menu with one or more options for selecting one or more links 104 for inclusion in the reading list.

In some implementations, a visual, audio or force feedback cue can be provided to the user indicating that the selection mode has been entered. For example, a flash or vertical transition sweeping over the viewable links can be used to provide visual feedback to the user, a sound effect (e.g., a beep) can be used to provide audio feedback to the user, and a vibration can be used to provide force feedback to the user.

Figure 2:
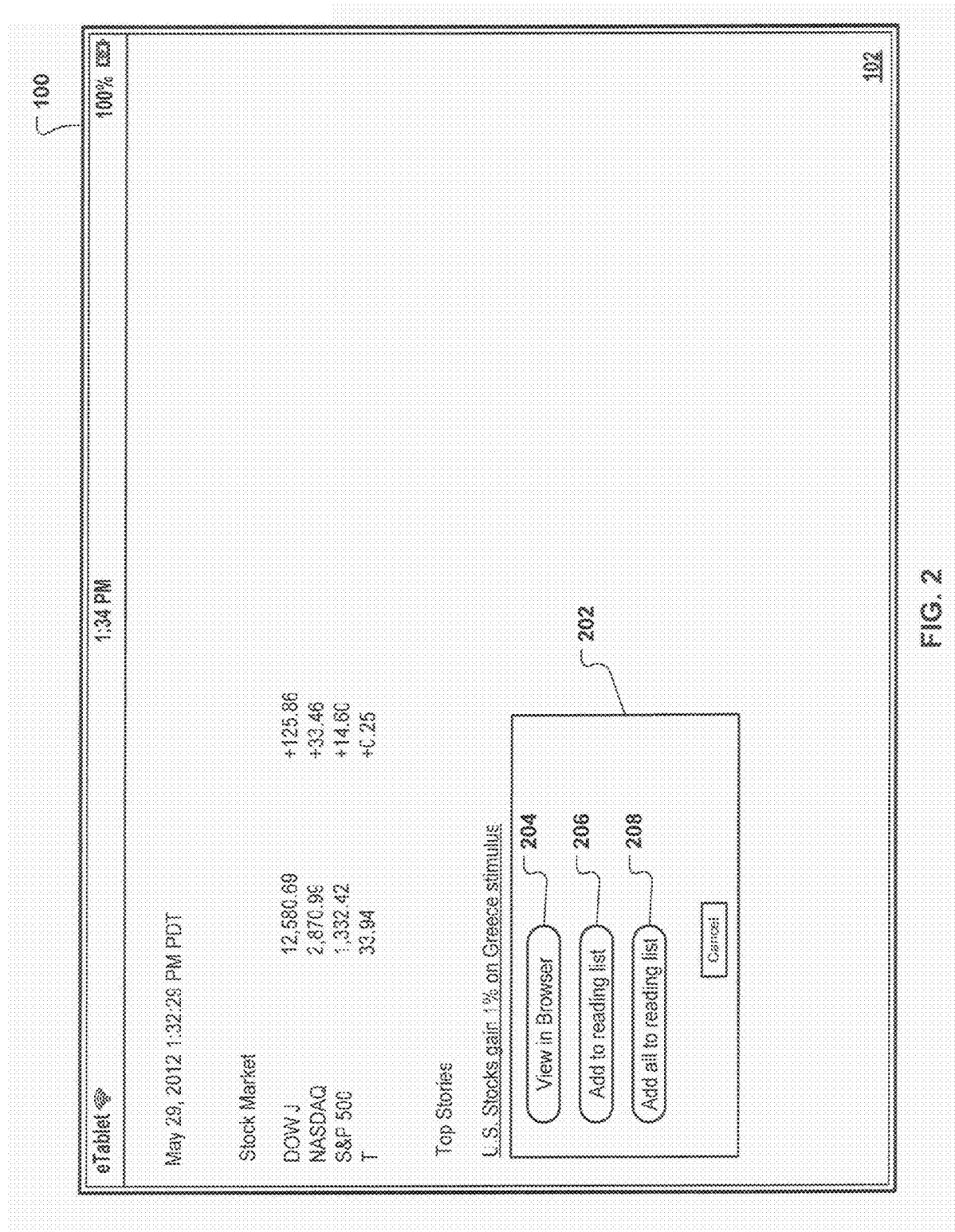

FIG. 2 illustrates a state of user interface 102 after the selection mode is entered. In this example, pane 202 is displayed in user interface 102. The entrance of pane 202 into user interface 102 can be animated. For example, pane 202 can be animated to slide down from the pressed link or from the sides, top or bottom of the display.

In some implementations, pane 202 can include elements 204, 206 and 207. These elements can be any user interface element, including but not limited to virtual buttons. In this example, pane 202 displays a "View in Browser" button 204 for invoking a browser application on device 100 and displaying (e.g., automatically displaying) the webpage corresponding to the selected link in the browser window. Pane 202 also displays a "Add to reading list" button 206 for adding the link to a reading list for later reading. Pane 202 also displays an "Add all to reading list" button 208 for adding all of links 104 embedded in the currently displayed webpage to the reading list. After selecting one of buttons 204, 206 and 208, the option is executed and pane 202 is removed from user interface 102.

Figure 3:
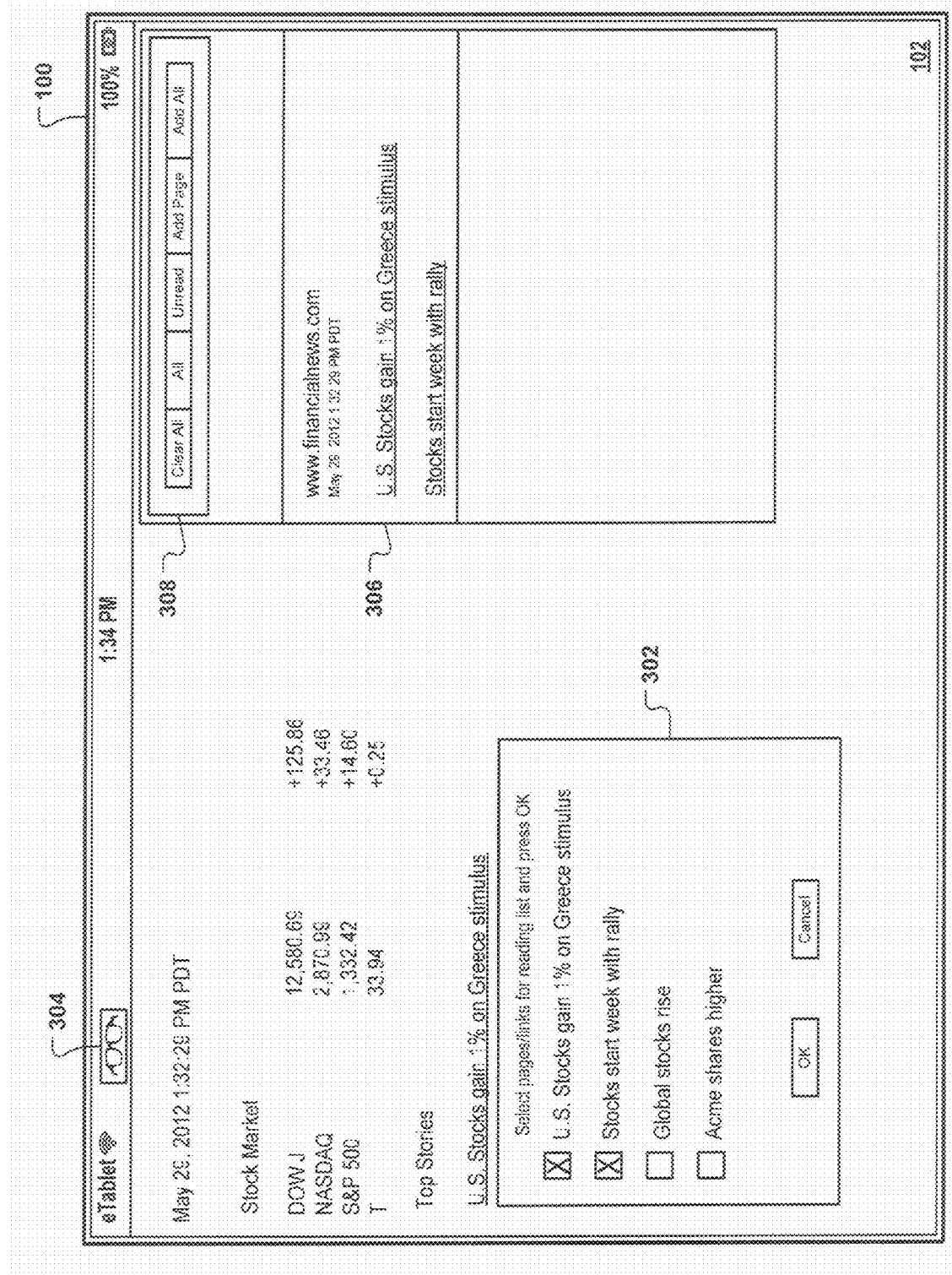

FIG. 3 illustrates a state of user interface 102 after button 206 is selected. In response to button 206 being selected, pane 302 is displayed in user interface 102. Pane 302 includes all of links available in the currently displayed webpage for later reading and provides user interface elements for selecting one or more links for inclusion in the reading list. In this example, pane 302 includes a check box next to each link and the user has checked the first two links in pane 302. The links can be displayed in pane 302 in the order they are encountered in the stocks application or in an order specified programmatically by an application or by a user through a settings option. For example, the links can be presented in alphabetical order or based on a category or group, as described in reference to FIG. 5.

Also illustrated in FIG. 3 is an exemplary reading list 306. In this example, the user has invoked reading list 306 by pressing button 304 in user interface 102. Reading list 306 also can be invoked using a menu option or any other desired input mechanism. Reading list 306 includes the links selected from pane 302. The user can invoke reading list 306 at any time in the future and select a link to access the webpage corresponding to the link.

In some implementations, the webpage is retrieved from its source website. In other implementations, the webpage information is stored in memory on device 100. Storing the webpage information on device 100 allows the user to retrieve and read the webpage even when device 100 is disconnected from the network. In some implementations, the webpage can be reformatted (e.g., to remove advertisements) before being displayed on device 100.

Reading list 306 can include menu bar 308 for managing or filtering the display of links in reading list 306. In this example, the options include "Clear All" to clear all links from the reading list, "All" to display all links, "Unread" to display only unread links, "Add Page" to add the currently viewed webpage and "Add all" to add all of the links in the currently viewed webpage. The last two options provide an alternative means for adding a currently displayed webpage to reading list 306.

Figure 4:
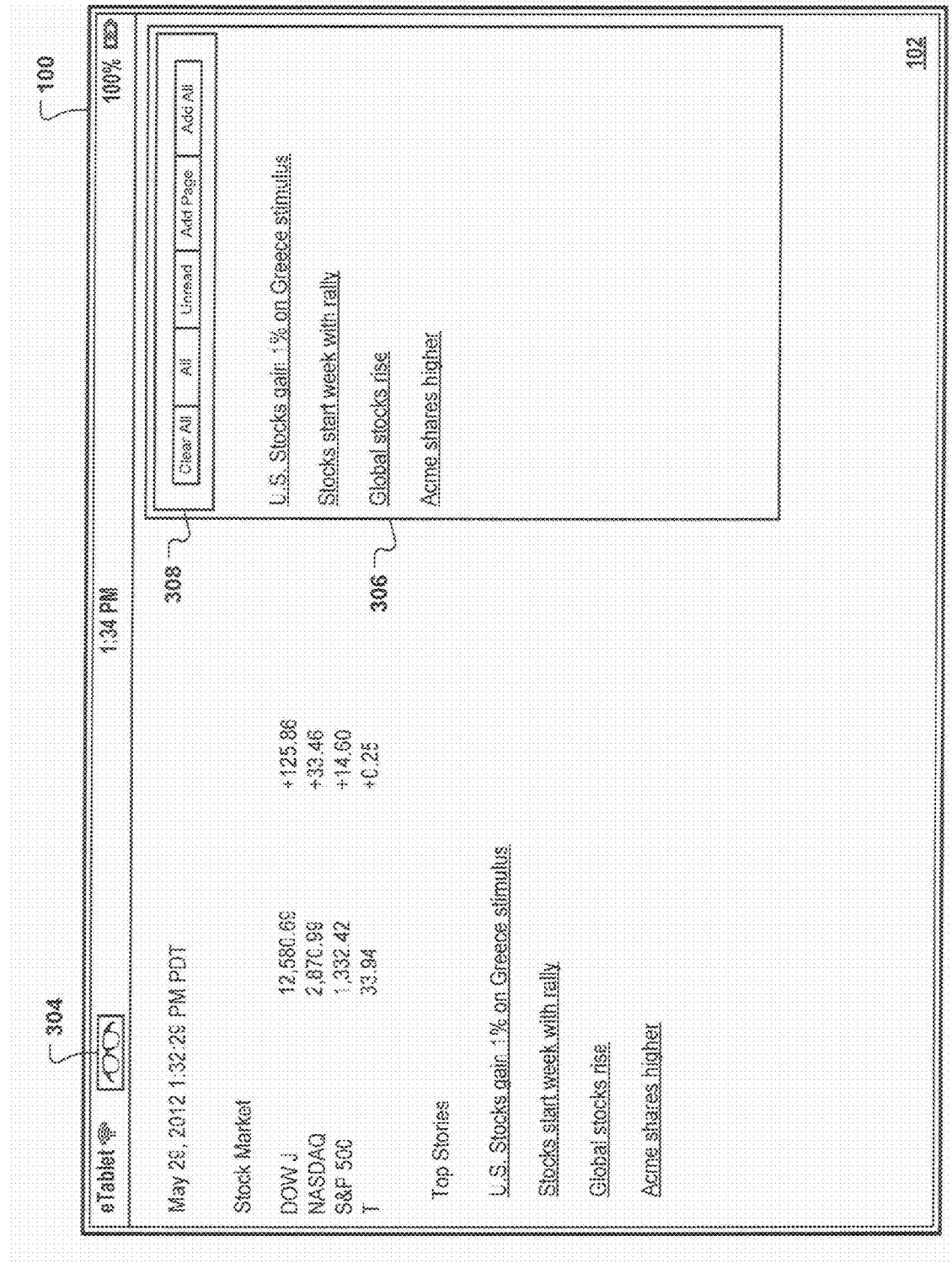

FIG. 4 illustrates a state of user interface 102 after button 208 is selected. In response to button 208 being selected, pane 302 is displayed in user interface 102. Pane 302 includes all of displayed links for later reading. No user interface elements (e.g., check boxes) are provided for selecting.

Figure 5:
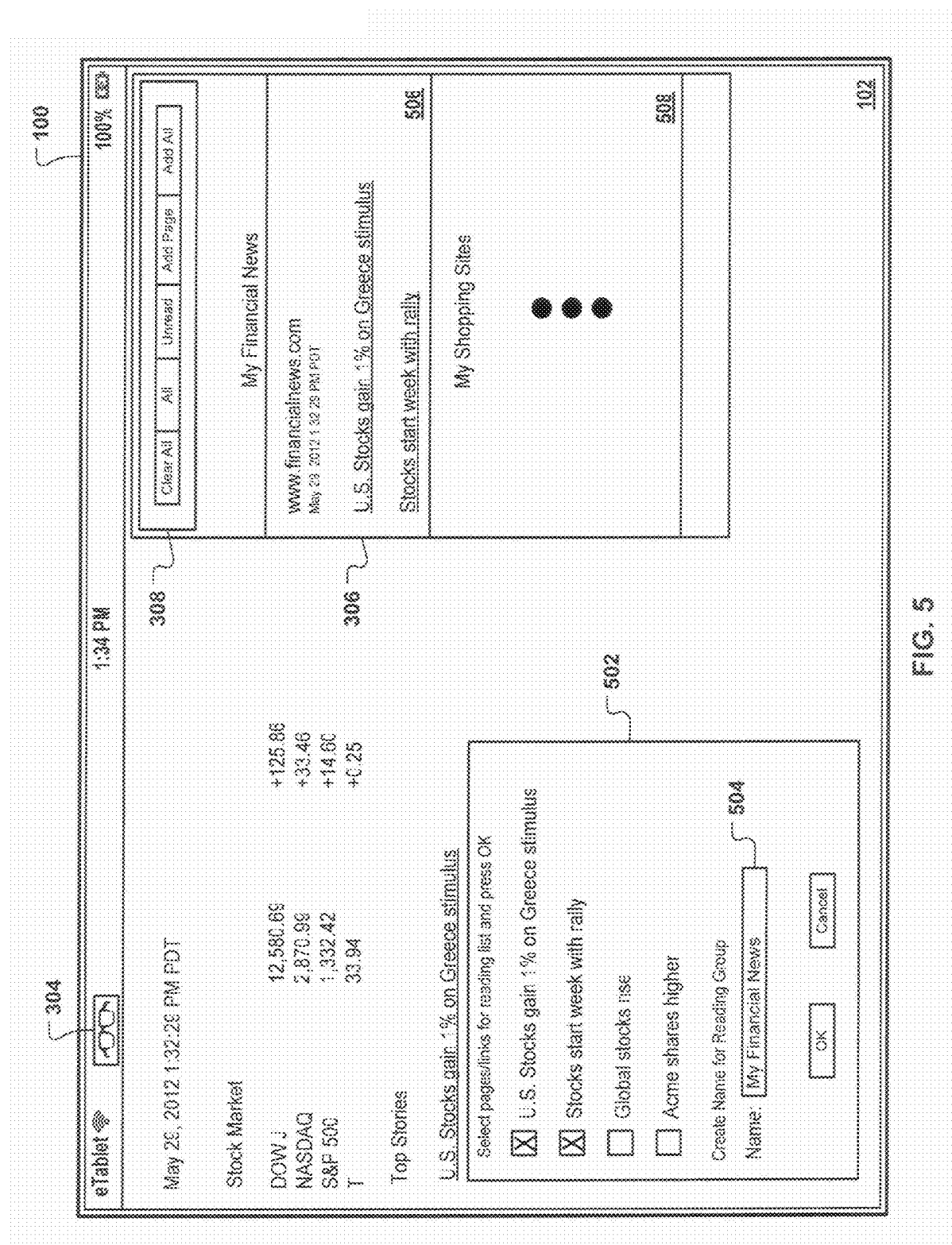

FIG. 5 illustrates a state of user interface 102 after button 206 is selected. In response to button 206 being selected, pane 502 is displayed in user interface 102. Pane 502 includes all of links available in the stocks application for later reading and provides user interface elements for selecting one or more links for inclusion in the reading list. In this example, pane 502 includes a check box next to each link and the user has checked the first two links in pane 502. In this example, pane 502 also includes a user interface element 504 for entering a name or label for the selected link(s). By entering a name, the selected links are displayed in reading list 306 as a group, with the entered name/label as a header. In the example shown, the user selected the first two links in pane 502 by checking their respective check boxes and also entered the name "My Financial News" in user interface element 504 (e.g., a text input box). The selected links are displayed adjacent to each other in reading list 306 under the name/label "My Financial News." Note that the user also has added a group of links (not shown) to reading list 306 that were taken from one or more shopping websites and labeled "My Shopping Sites."

Using this grouping feature, the user can group links together under a common name or label in reading list 306. The groups can be visually delineated in reading list 306 using any desired visual effects, including but not limited to text, lines, background colors or patterns, animation, highlighting, glowing effect, etc.

Adding Links from Communications and Other Documents

Figure 6:
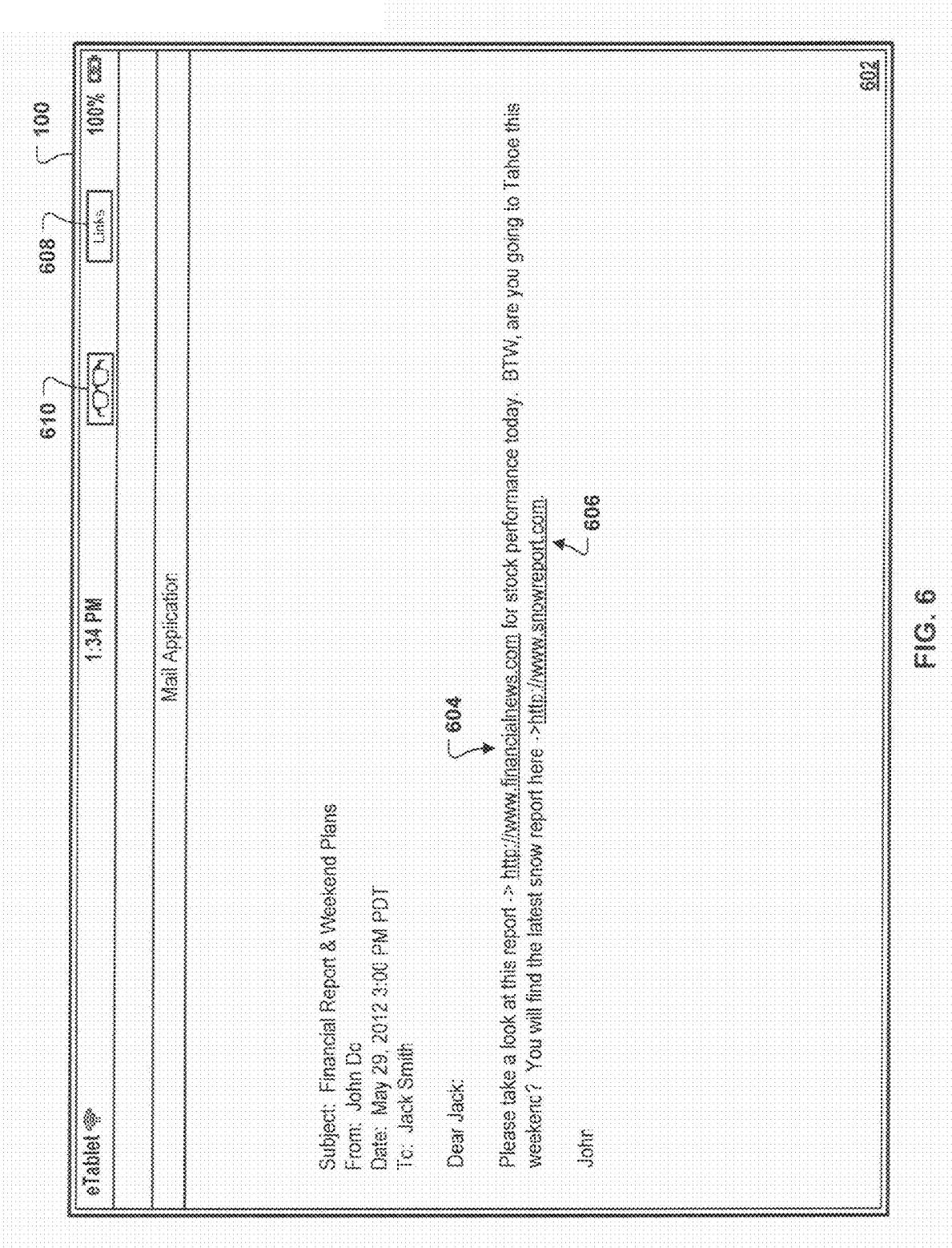
FIGS. 6-8 illustrate exemplary user interface elements for a mail application for selecting multiple webpages or links for later reading.

FIG. 6 illustrates adding links from e-mail communications. In the example shown, text from e-mail 602 displayed on device 100 includes two links 604, 606. However, any number of links can be included. In some implementations, the user can select user interface element 608 to collect a list of all links in e-mail 602. In other implementations, links can be automatically collected when the e-mail is received or opened. In some implementations, links can be collected when the user interacts with one of the links, such as a long press, hover or click as described in reference to FIG. 1.

Figure 7:
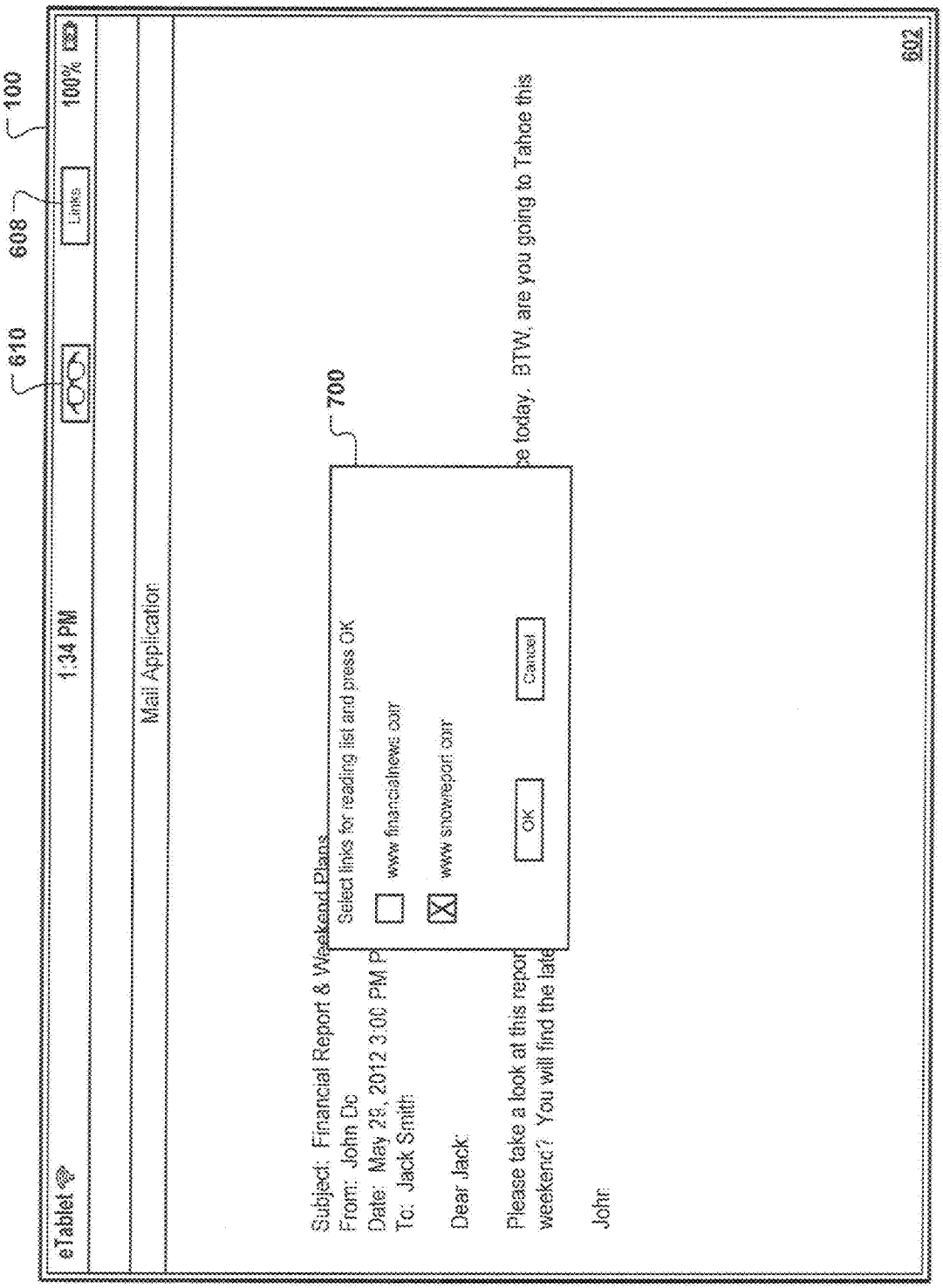

FIG. 7 illustrates pane 700 that is displayed in response to the user selecting user interface element 608. Pane 700 includes a list of all links in e-mail 602. Check boxes are listed next the links to allow the user to select the links to be included in a reading list. In the example shown, the user selected link 606 for www.snowreport.com.

Figure 8:
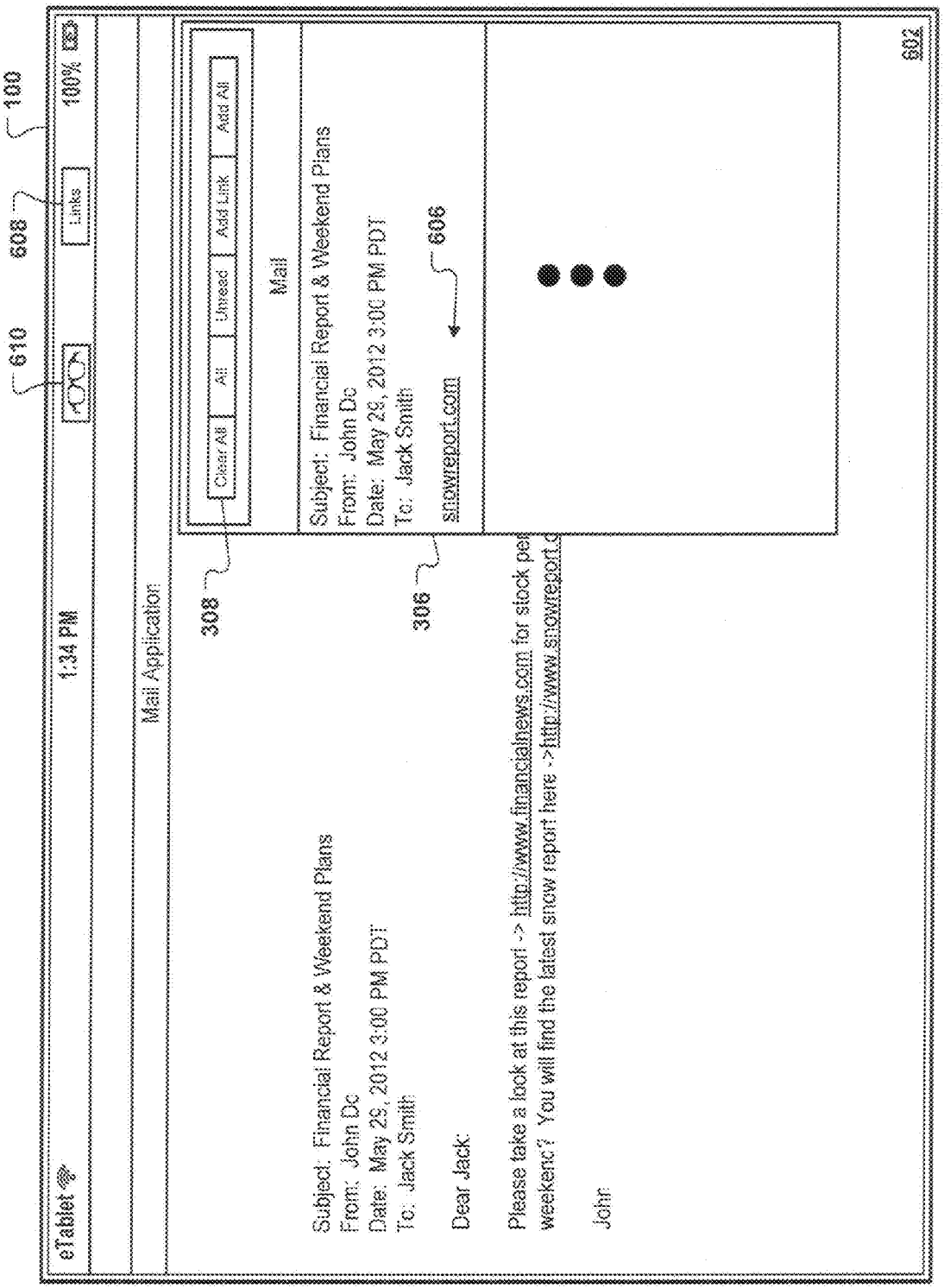

FIG. 8 illustrates reading list 306 after a selection is made in pane 700. In this example, reading list 306 includes link 606 for www.snowreport.com, which was selected by the user in pane 700. Also displayed is the e-mail header to provide context for the link. In some implementations, the subject line of the e-mail or a snippet of text surrounding the selected link is displayed to provide context for the user. The links can be displayed in a group in reading list 306 under a "mail" label or other suitable label.

In addition to e-mails, the disclosed implementations are also applicable to other types of communications and documents. For example, .pdf and word processing documents often include embedded links to webpages. When a user opens these documents using a .pdf reader or word processor, for example, the links can be collected and presented to the user for inclusion into a reading list or other data structure, as previously described in reference to FIG. 5.

In some implementations, links can be collected from social networking sites and blogs. For example, a user interface element or other input mechanism can be presented on a social network page that allows the user to collect links from posts or other messages or documents.

For any of the above-described communications and documents, links can be collected according to a user-specified criteria. For example, a user of a social network can specify that all links be collected for posts that were published to the user's "wall" or other communication domain over a user-specified date range. In another example, links posted by a particular individual or group, or that contain certain topics or keywords can be collected for potential inclusion into a reading list using the user interface elements described in reference to FIGS. 5-7. In sum, any suitable criteria can be used to collect links for potential inclusion into a reading list or other data structure for later reading. The criteria can be specified by an application or network-based service provider or can be user-specified using a suitable settings option.

In some implementations, user interface elements for collecting links can be context-sensitive and based on the communication or document type. For example, the communication or document type can first be identified, and then an appropriate user interface element for entering a selection mode or for initiating collection of links can be generated for display.

Exemplary Process

Figure 9:
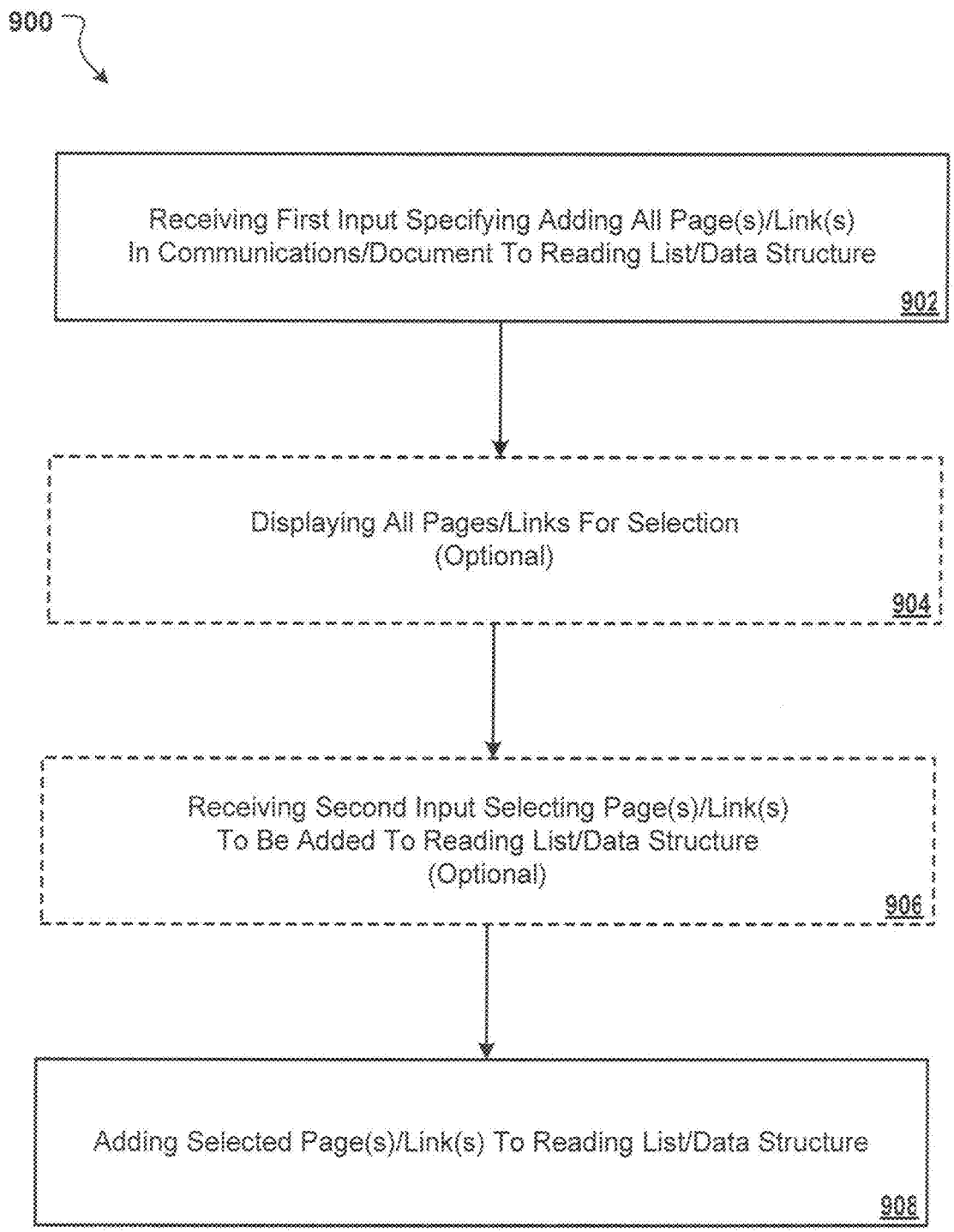
FIG. 9 is a flow diagram of exemplary process for selecting multiple webpages or links for later reading.

FIG. 9 is a flow diagram of exemplary process 900 for selecting multiple webpages or links from communications or documents for later reading. Process 900 can be implemented using the device architecture and operating environment described in reference to FIGS. 10 and 11, respectively.

In some implementations, process 900 can begin by receiving input specifying adding all page(s)/link(s) in a communication or document to a reading list or other data structure (902). The input can be provided using one or more user interface elements, such as the user interface elements described in reference to FIGS. 1-8.

Process 900 can continue by generating for display all page(s)/link(s) on a display of a device for selection (904). The displaying can be implemented using various panes, windows, lists or any suitable user interface elements. Examples of suitable user interface elements were described in reference to FIGS. 1-8. Step 904 can be optional depending on which one of user interface elements 204, 206, 208 are selected (See FIG. 2). For example, if the user selects button 208, all the links are added to the reading list or other data structure without allowing the user to select individual links for inclusion into the reading list or other data structure. In this example use scenario, step 906 would also be skipped.

If step 904 is performed, process 900 continues by receiving second input selecting page(s)/link(s) to be added to the reading list or other data structure (906). The selecting step can be implemented using, for example, check boxes. Other suitable user interface elements can also be used to select links.

Process 900 can continue by adding the selected page(s)/link(s) to the reading list or other data structure (908).

Exemplary Device Architecture

Figure 10:
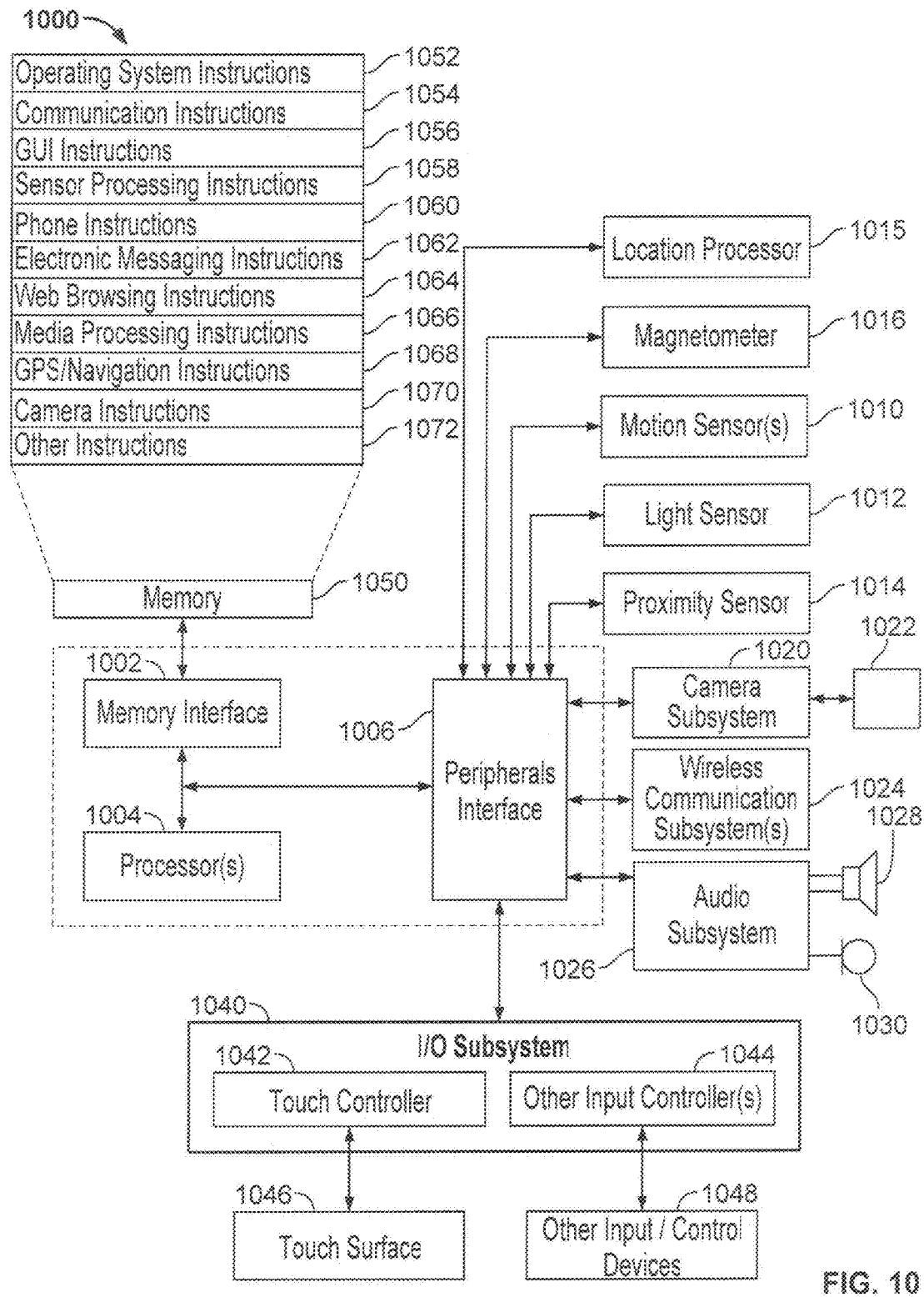
FIG. 10 is a block diagram of an exemplary architecture of a device that implements at least part of the process of FIG. 9.

FIG. 10 is a block diagram of an exemplary architecture 1000 of a device that performs process 900. Architecture 1000 can be implemented in any device, including but not limited to portable or desktop computers, smart phones and electronic tablets, television systems, game consoles, kiosks and the like. Architecture 1000 can include memory interface 1002, data processor(s), image processor(s) or central processing unit(s) 1004, and peripherals interface 1006. Memory interface 1002, processor(s) 1004 or peripherals interface 1006 can be separate components or can be integrated in one or more integrated circuits. The various components described above can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the device. For example, in some implementations, light sensor 1012 can be utilized to facilitate adjusting the brightness of touch surface 1046. In some implementations, motion sensor 1010 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1006, such as a temperature sensor, a biometric sensor, or other sensing device, to facilitate related functionalities.

Location processor 1015 (e.g., GPS receiver) can be connected to peripherals interface 1006 to provide geo-positioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1024. Communication subsystem(s) 1024 can include one or more wireless communication subsystems. Wireless communication subsystems 1024 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1024 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1024 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1026 can be coupled to a speaker 1028 and one or more microphones 1030 to facilitate voice-enabled functions, such as voice recognition, voice replication, digital recording, and telephony functions.

I/O subsystem 1040 can include touch controller 1042 and/or other input controller(s) 1044. Touch controller 1042 can be coupled to a touch surface 1046. Touch surface 1046 and touch controller 1042 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1046. In one implementation, touch surface 1046 can display virtual or soft buttons and a virtual keyboard, which can be used as an input/output device by the user.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In some implementations, device 1000 can present recorded audio and/or video files, such as MP3, AAC, and MPEG files. In some implementations, device 1000 can include the functionality of an MP3 player and may include a pin connector for tethering to other devices. Other input/output and control devices can be used.

Memory interface 1002 can be coupled to memory 1050. Memory 1050 can include high-speed random access memory or non-volatile memory, such as one or more magnetic disk storage devices, one or more optical storage devices, or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers or servers, such as communicating with servers 102, 104 through network 106. Communication instructions 1054 can also be used to select an operational mode or communication medium for use by the device, based on a geographic location (obtained by the GPS/Navigation instructions 1068) of the device. Memory 1050 may include graphical user interface instructions 1056 to facilitate graphic user interface processing, such as generating and displaying the various user interface elements described in reference to FIGS. 1-8; sensor processing instructions 1058 to facilitate sensor-related processing and functions; phone instructions 1060 to facilitate phone-related processes and functions; electronic messaging instructions 1062 to facilitate electronic-messaging related processes and functions, including instructions for implementing an e-mail application described in reference to FIG. 5; web browsing instructions 1064 to facilitate web browsing-related processes and functions, including facilitating communication with a services 1130 described in reference to FIG. 11; media processing instructions 1066 to facilitate media processing-related processes and functions; GPS/Navigation instructions 1068 to facilitate GPS and navigation-related processes; camera instructions 1070 to facilitate camera-related processes and functions; and other instructions 1072. The memory 1050 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Exemplary Operating Environment

Figure 11:
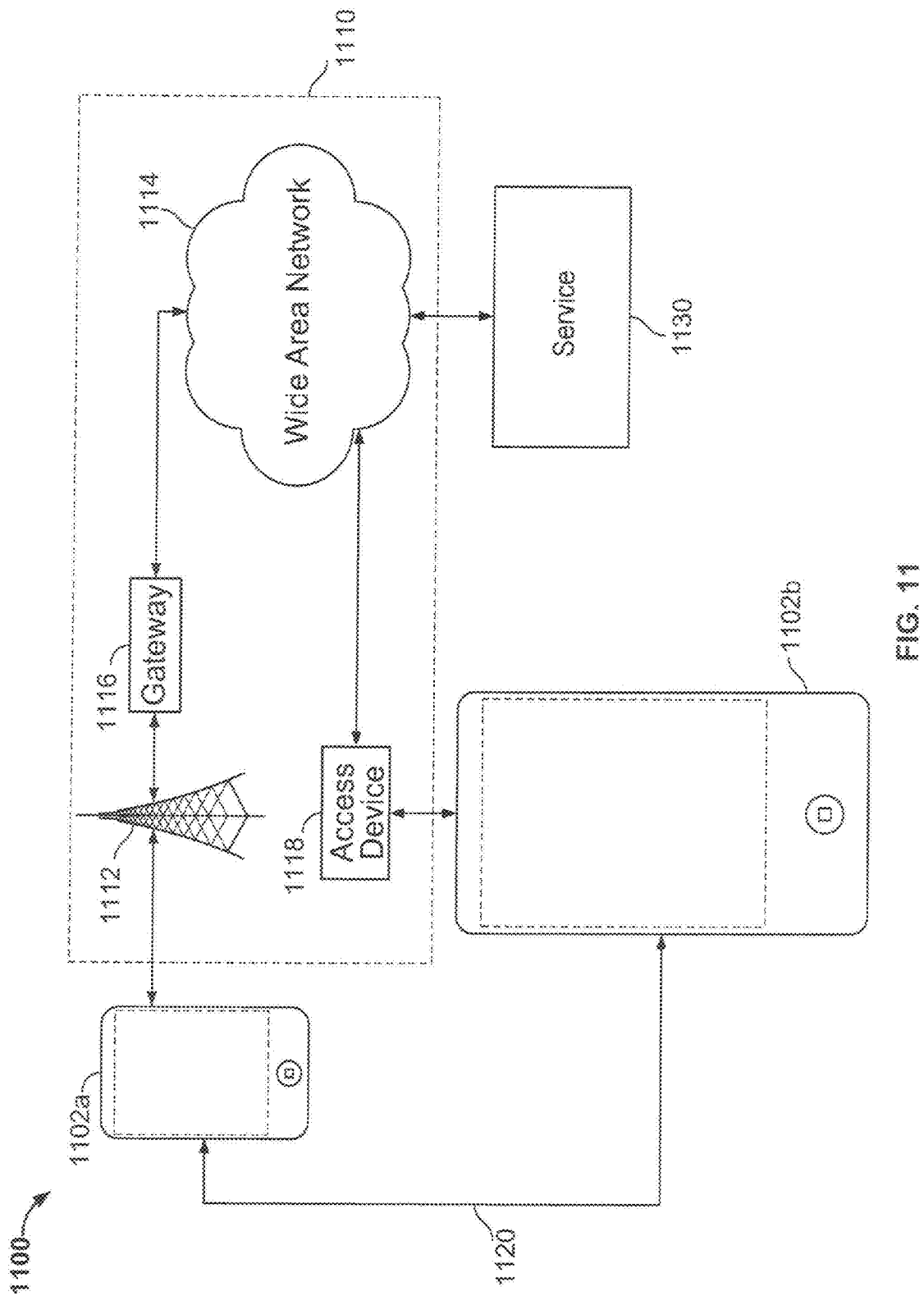
FIG. 11 is a block diagram of an operating environment for selecting multiple webpages or links for later reading.

FIG. 11 is a block diagram of an operating environment for selecting multiple webpages or links for later reading.

In some implementations, devices 1102a and 1102b can communicate over one or more wired or wireless networks 1110. For example, wireless network 1112 (e.g., a cellular network) can communicate with a wide area network (WAN) 1114 (e.g., the Internet) by use of gateway 1116. Likewise, access device 1118 (e.g., IEEE 802.11g wireless access device) can provide communication access to WAN 1114. Devices 1102a, 1102b can be any device capable of displaying GUIs, including but not limited to portable computers, smart phones and electronic tablets. In some implementations, the devices 1102a, 1102b do not have to be portable but can be a desktop computer, television system, kiosk system or the like.

In some implementations, both voice and data communications can be established over wireless network 1112 and access device 1118. For example, device 1102a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 1112, gateway 1116, and WAN 1114 (e.g., using Transmission Control Protocol/Internet Protocol (TCP/IP) or User Datagram Protocol (UDP)). Likewise, in some implementations, device 1102b can place and receive phone calls, send and receive e-mail messages, and retrieve electronic documents over access device 1118 and WAN 1114. In some implementations, device 1102a or 1102b can be physically connected to access device 1118 using one or more cables and access device 1118 can be a personal computer. In this configuration, device 1102a or 1102b can be referred to as a "tethered" device.

Devices 1102a and 1102b can also establish communications by other means. For example, wireless device 1102a can communicate with other wireless devices (e.g., other devices 1102a or 1102b, cell phones) over the wireless network 1112. Likewise, devices 1102a and 1102b can establish peer-to-peer communications 1120 (e.g., a personal area network) by use of one or more communication subsystems, such as the Bluetooth™ communication devices. Other communication protocols and topologies can also be implemented.

Devices 1102*a* or 1102*b* can communicate with service 1130 over the one or more wired and/or wireless networks 1110. For example, service 1130 can be any service that provides webpages using a web server, including a social networking website, blog or Twitter®, as described in reference to FIG. 3.

Device 1102*a* or 1102*b* can also access other data and content over one or more wired and/or wireless networks 1110. For example, content publishers, such as news sites, Really Simple Syndication (RSS) feeds, Web sites and developer networks can be accessed by device 1102*a* or 1102*b*. Such access can be provided by invocation of a web browsing function or application (e.g., a browser) running on the device 1102*a* or 1102*b*.

Devices 1102*a* and 1102*b* can exchange files over one or more wireless or wired networks 1110 either directly or through service 1130.

Exemplary User Interface Elements

FIGS. 12A-12D illustrate exemplary user interface elements associated with the adding of a webpage or link to a data structure to a device. Adding can include saving information related to the webpage (e.g., a URL) so that the webpage can be retrieved for later reading by, for example, a Web browser. Adding can be to the same device where the webpage to be added is displayed. A data structure can be any structure for storing information, such as a reading list, bookmark list, etc.

Referring to FIG. 12A, user interface 1200 includes tool bar 1201. Tool bar 1201 includes user interface element 1206 for indicating adding progress. User interface 1200 can be a Web browser window for displaying the webpage or link to be added. The webpage (including any embedded links to other webpages) can be selected for adding using techniques previously described in this disclosure. For example, user interface element 1203 (e.g., + button) can be selected by a user to initiate adding of the webpage or link displayed in user interface 1200, which in this example is a Web browser window.

FIGS. 12B and 12C further illustrate an animated transition from user interface element 1210 representing a first data structure (e.g., a bookmark list) to user interface element 1206 representing a second data structure (e.g., a reading list). When a webpage or link is not being added, the user interface element 1210 (e.g., open book icon) is displayed in tool bar 1201. If the user selects (e.g., presses, touches, clicks) user interface element 1210, drop down menu 1202 is displayed on user interface 1200. Menu 1202 includes a list of webpage or link descriptions available for reading and the status of webpages or links being added. The webpage or link descriptions can include a snippet of text from the webpage, an icon, branding, a summary of the webpage and any other desired descriptive information.

A webpage or link that is currently being added can be represented by an animated graphical object 1207 (e.g., a spinning wheel or hourglass) and/or text, such as "Saving for offline reading . . . ." A webpage or link that is waiting to be added can be represented by text, such as "Waiting . . . ." Status can also be indicated by other means such as color changes or other visual clues, animation and/or audio or force feedback.

In some implementations, menu 1202 can include user interface elements 1208 (e.g., tabs) for providing selectable options. In the example shown, tabs are provided for selectively displaying one of a history list, a bookmark list or a reading list. In the example shown, the reading list tab is selected (indicated by the highlighted glasses icon). Tabs 1204 allow the user to display all content in the reading list or only unread content in the reading list.

Referring to FIGS. 12B and 12C, during adding user interface element 1210 (bookmark icon) transitions to user interface element 1206 (reading list icon) using animation, such that user interface element 1210 is replaced with user interface element 1206 at the end of the animated transition. Any desired animation effect can be used for the transition, including but not limited to sliding, flipping, fading in/out, etc. In the example shown, user interface element 1206 also includes progress indicator 1212 for visually indicating the progress of adding the webpage to the reading list. For example, progress indicator 1212 can be a representative graphical object (a bar) that fills with color, shading or a pattern to indicate adding progress. When adding is completed, user interface element 1206 (reading list icon) transitions back to user interface element 1210 (bookmark icon). The transition can be animated using the same or different animation as the transition from user interface element 1210 to user interface element 1206.

FIG. 12D illustrates another example progress indicator 1214 for a data structure. During adding, progress indicator 1214 is a representative graphical object that is visually augmented (e.g., fills with color, shading or a pattern) to indicate the adding progress.

Figure 13:
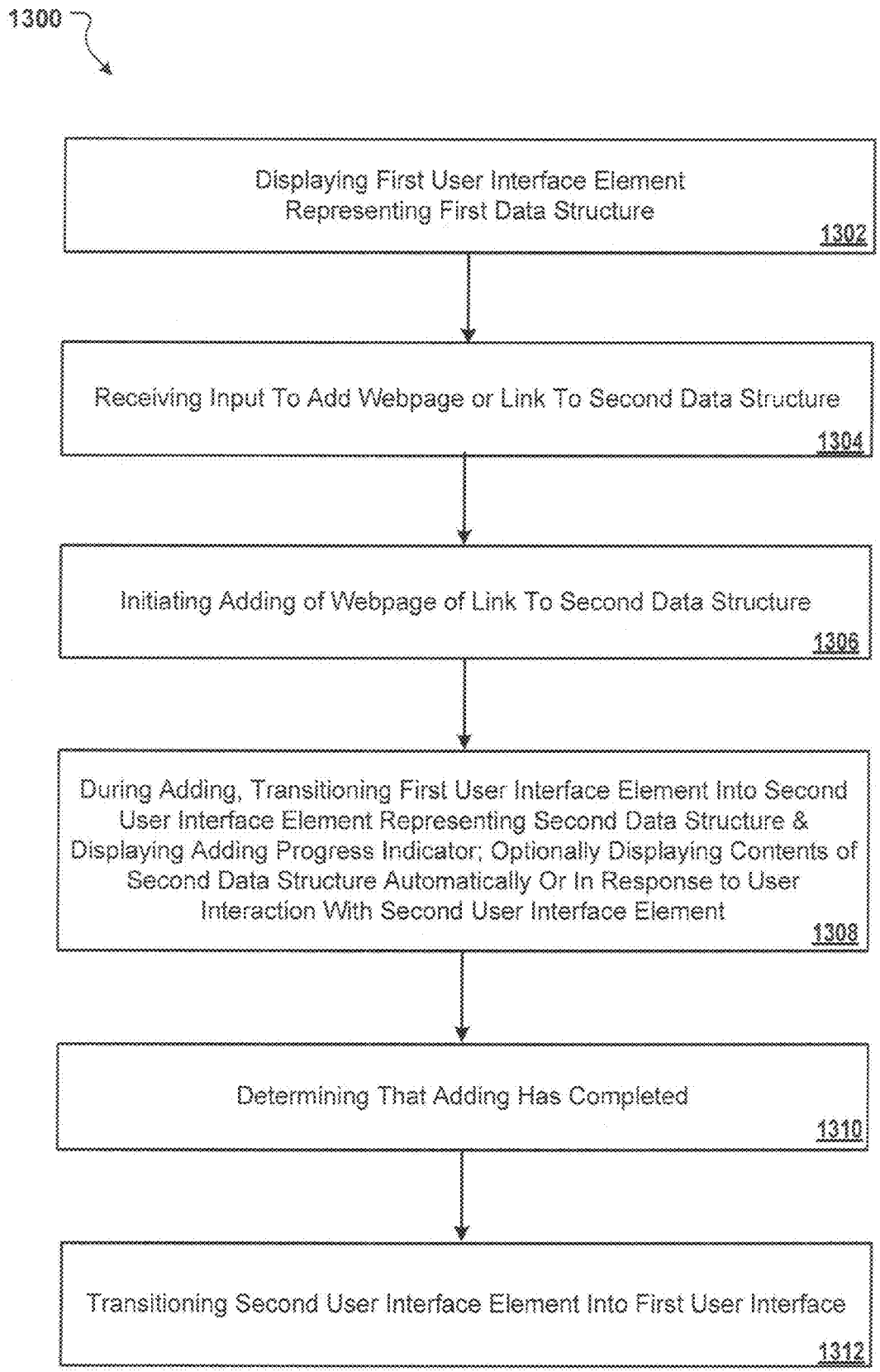
FIG. 13 is a flow diagram of an exemplary process of adding a webpage or link to a data structure.

FIG. 13 is a flow diagram of an exemplary process 1300 of adding a webpage or link to a data structure.

Process 1300 can begin by displaying a first user interface element representing a first data structure (1302). The first user interface element can be, for example, a graphical object representing a bookmark list.

Process 1300 can continue by receiving input to archive a webpage or link to a second data structure (1304). The second data structure can be, for example, a reading list. The input can be user input.

Process 1300 continues by initiating the adding of the webpage or link to the second data structure (1306). During the adding step, information related to the webpage or link can be stored in memory on the device.

During the adding step, process 1300 continues by transitioning the first user interface element into a second user interface element representing the second data structure (1308). The second user interface element can include a first representative graphical object representing the second data structure and a second representative graphical object representing progress of adding information related to the webpage or link into the second data structure. The transitioning can be implemented using any desired animation effect (e.g., sliding, flipping). Transitioning can include replacing the first user interface element with the second user interface element. In some implementations, the contents of the second data structure can be displayed during adding automatically or in response to user interaction with the second user interface element.

Process 1300 can continue by determining that adding has completed (1310), and transitioning the second user interface element into the first user interface element (1312). The transitioning can be implemented using any desired animation effect (e.g., sliding, flipping). Transitioning can include replacing the second user interface element with the first user interface element.

Figure 14B:
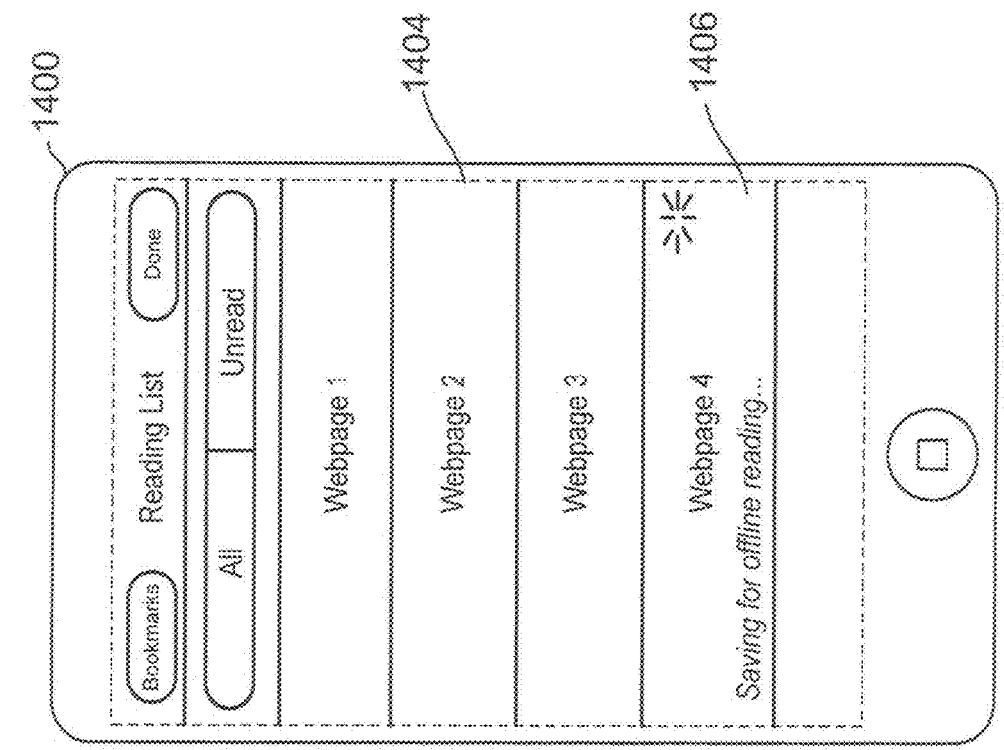
FIGS. 14A and 14B illustrate an exemplary user interface and interactive user interface element associated with adding a web page or link to a data structure.
Figure 14A:
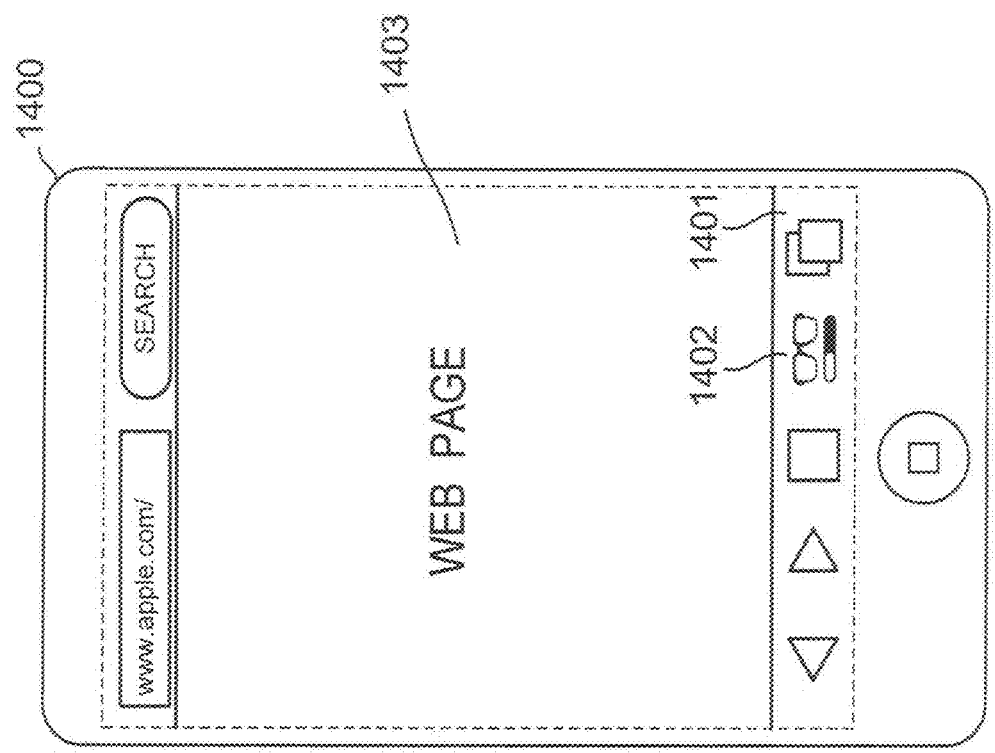

FIG. 14A illustrates an exemplary user interface 1400 and interactive user interface element 1402 associated with the adding of a web page or link to a data structure. In some implementations, device 1400 can display a webpage in browser window 1403. Browser window 1403 can be presented on a touch sensitive display that is response to a user's finger touches and gestures. Tool bar 1401 can be included at the bottom of the browser window 1403 or any other suitable location in the browser window or chrome. Tool bar 1401 can include user interface element 1402 associated with adding and for indicating adding progress. User interface element 1402 functions as described in reference to user interface element 1206 shown in FIGS. 12A-12D. User interface can be displayed in response to a user selecting buttons 206 or 208, as described in reference to FIG. 2

In some implementations, user interface element 1402 can be pressed or touched to display the contents of the data structure, which in this example is a reading list 1404, as shown in FIG. 14B. Reading list 1404 can "slide" in from the bottom of the touch sensitive display, or can slide into the display from the top or sides of the touch sensitive display. In general, any desired animation effect can be used to transition reading list 1404 onto the touch sensitive display. Reading list 1404 can be scrollable by the user's fingers.

In the example shown, Webpage 4 represented by webpage description 1406 is currently being added to reading list 1404, as indicated by the animated graphical object and text description: "Saving for offline reading . . . ." When the adding step has completed, user interface element 1402 transitions back to the user interface element prior to the adding.

In some implementations, voice commands can be used as inputs for initiating the adding of webpages or links to a data structure. The voice commands can be processed by a speech recognition engine on the device.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    displaying a first user interface element on a display of a device, the first user interface element representing a first data structure;
    receiving first input to initiate adding a webpage or link to a second data structure;
    initiating the adding of the webpage or link to the second data structure; and
    during the adding, transitioning the first user interface element into a second user interface element representing the second data structure, the second user interface element including a first representative graphical object representing the second data structure, where the method is performed by one or more hardware processors.

2. The method of claim 1, where the first representative graphical object is visually augmented to represent progress of the adding information related to the webpage or link into the second data structure.

3. The method of claim 1, where the second user interface element includes a second representative graphical object representing progress of adding information related to the webpage or link into the second data structure.

4. The method of claim 1, where the first data structure is a bookmark list and the second data structure is a reading list.

5. The method of claim 4, where the reading list includes descriptions of webpages or links that have been added and an animated graphical object indicating that adding a webpage or link is in progress.

6. The method of claim 4, where the reading list includes user interface elements for selecting one of the bookmark list or a history list.

7. The method of claim 4, where the reading list includes user interface elements for selecting for display all content in the reading list or only unread content in the reading list.

8. The method of claim 1, further comprising:
    receiving second input directed to the second user interface element; and
    responsive to the second input, displaying the second data structure on the display of the device.

9. The method of claim 8, where the second data structure is a reading list and displaying the reading list includes animating the reading list so that it appears to slide into position on the display of the device.

10. The method of claim 1, where the second graphical element is a bar that fills to indicate progress of the adding.

11. A system comprising:
    one or more processors;
    memory coupled to the one or more processors and configured for storing instructions, which, when executed by the one or more processors, causes the one or more processors to perform operations comprising:
    displaying a first user interface element on a display of a device, the first user interface element representing a first data structure;
    receiving first input to add a webpage or link to a second data structure; and
    during the adding, transitioning the first user interface element into a second user interface element representing the second data structure, the second user interface element including a first representative graphical object representing the second data structure.

12. The system of claim 11, where the first representative graphical object is visually augmented to represent progress of the adding information related to the webpage or link into the second data structure.

13. The system of claim 11, where the second user interface element includes a second representative graphical object representing progress of adding information related to the webpage or link into the second data structure.

14. The system of claim 11, where the first data structure is a bookmark list and the second data structure is a reading list.

15. The system of claim 14, where the reading list includes descriptions of webpages or links that have been added and an animated graphical object indicating that adding a webpage or link is in progress.

16. The system of claim 14, where the reading list includes user interface elements for selecting one of the bookmark list or a history list.

17. The system of claim 14, where the reading list includes user interface elements for selecting for display all content in the reading list or only unread content in the reading list.

18. The system of claim 11, where the instructions include instructions, which, when executed by the one or more processors, causes the one or more processors to perform operations comprising:
    receiving second input directed to the second user interface element; and
    responsive to the second input, displaying the second data structure on the display of the device.

19. The system of claim 18, where the second data structure is a reading list and displaying the reading list includes animating the reading list so that it appears to slide into position on the display of the device.

20. The system of claim 11, where the second graphical element is a bar that fills to indicate progress of the adding.

21. A non-transitory computer readable storage medium storing one or more programs, the one or more programs comprising instructions, which when executed by an electronic device with a display cause the device to perform operations comprising:
    displaying a first user interface element on a display of a device, the first user interface element representing a first data structure;
    receiving first input to add a webpage or link to a second data structure; and
    during the adding, transitioning the first user interface element into a second user interface element representing the second data structure, the second user interface element including a first representative graphical object representing the second data structure.

22. The computer readable storage medium of claim 21, where the first representative graphical object is visually augmented to represent progress of the adding information related to the webpage or link into the second data structure.

23. The computer readable storage medium of claim 21, where the second user interface element includes a second representative graphical object representing progress of adding information related to the webpage or link into the second data structure.

24. The computer readable storage medium of claim 21, where the first data structure is a bookmark list and the second data structure is a reading list.

25. The computer readable storage medium of claim 24, where the reading list includes descriptions of webpages or links that have been added and an animated graphical object indicating that adding a webpage or link is in progress.

26. The computer readable storage medium of claim 24, where the reading list includes user interface elements for selecting one of the bookmark list or a history list.

27. The computer readable storage medium of claim 24, where the reading list includes user interface elements for selecting for display all content in the reading list or only unread content in the reading list.

28. The computer readable storage medium of claim 21, where the instructions include instructions, which, when executed by the one or more processors, causes the one or more processors to perform operations comprising:
  receiving second input directed to the second user interface element; and
  responsive to the second input, displaying the second data structure on the display of the device.

29. The computer readable storage medium of claim 28, where the second data structure is a reading list and displaying the reading list includes animating the reading list so that it appears to slide into position on the display of the device.

30. The computer readable storage medium of claim 21, where the second graphical element is a bar that fills to indicate progress of the adding.

* * * * *